Oct. 22, 1968     L. J. BISHOP     3,406,639

SIGNAL SYSTEM FOR CARRIER CONVEYOR SYSTEMS

Filed March 14, 1966     2 Sheets-Sheet 1

INVENTOR.
LEONARD J. BISHOP
BY
ATTORNEYS

Oct. 22, 1968  L. J. BISHOP  3,406,639
SIGNAL SYSTEM FOR CARRIER CONVEYOR SYSTEMS
Filed March 14, 1966  2 Sheets-Sheet 2
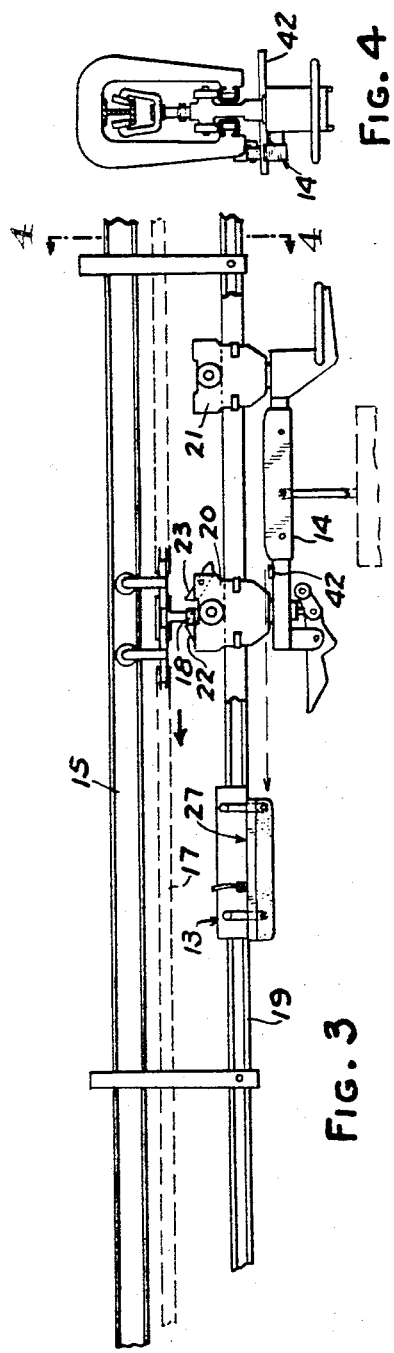
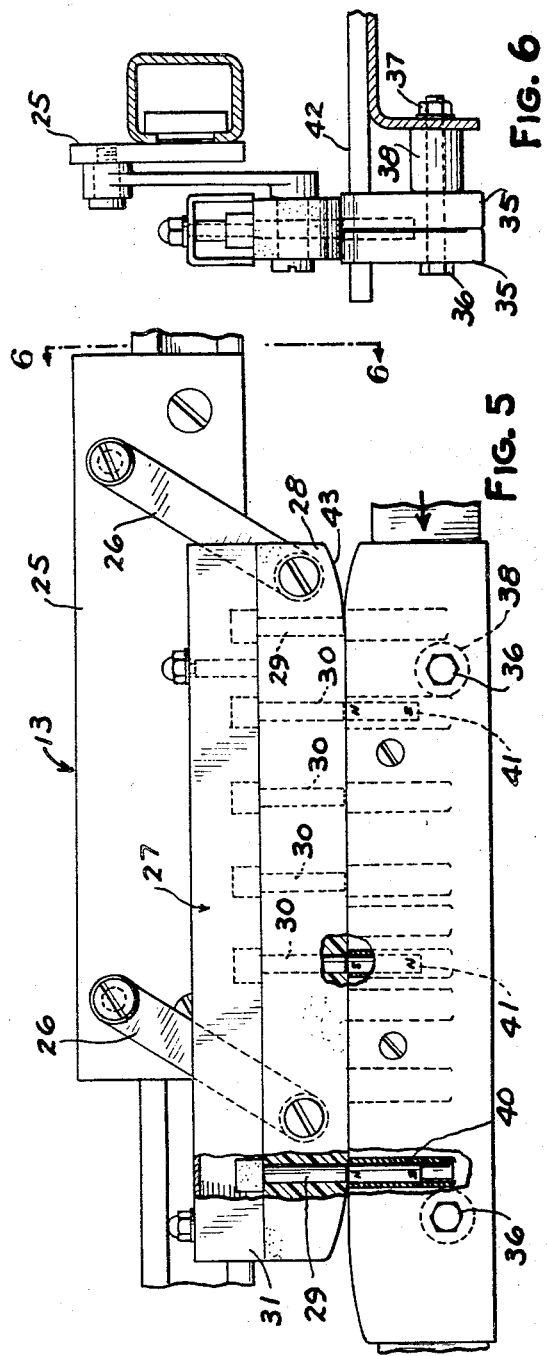
INVENTOR.
LEONARD J. BISHOP
BY
Barnes, Kisselle, Raisch & Choate
ATTORNEYS

United States Patent Office 3,406,639
Patented Oct. 22, 1968

3,406,639
SIGNAL SYSTEM FOR CARRIER
CONVEYOR SYSTEMS
Leonard J. Bishop, Birmingham, Mich., assignor to Mechanical Handling Systems, Inc., Warren, Mich., a corporation of Michigan
Filed Mar. 14, 1966, Ser. No. 534,099
12 Claims. (Cl. 104—88)

ABSTRACT OF THE DISCLOSURE

The carrier conveyor system disclosed herein comprises a track along which a plurality of carriers are moved. A reader assembly is mounted along the path for movement toward and away from the carriers. The reader assembly comprises a plurality of switches disposed longitudinally. At least some of the carriers support a signal assembly comprising a plurality of longitudinally spaced magnets selectively arranged to correspond to selected switches in the reader assembly.

This invention relates to signal systems for carrier conveyor systems and particularly to a signal system for a power and free conveyor system.

In carrier conveyor systems such as power and free conveyor systems, it is conventional to provide signal systems which actuate mechanisms to divert the carriers from a main conveyor to a branch conveyor, to divert a carrier from a branch track to a main track, to stop the carrier or otherwise act upon the carrier. In such signal systems, it is desirable that a signal on the carrier be read by a reader along the conveyor in order to signal the desired function to be performed on the carrier.

Among the objects of the present invention are to provide a signal system which is relatively simple, inexpensive and requires a minimum of maintenance.

In the drawings:

FIG. 3 is a fragmentary side elevational view of a portion of the conveyor system embodying the invention.

FIG. 4 is a fragmentary sectional view taken along the line 4—4 in FIG. 3.

FIG. 5 is a part sectional side elevational view on an enlarged scale showing portions of the system shown in FIGS. 3 and 4 with the carrier in signal reading position.

FIG. 6 is a fragmentary sectional view taken along the line 6—6 in FIG. 5.

Figure 1:
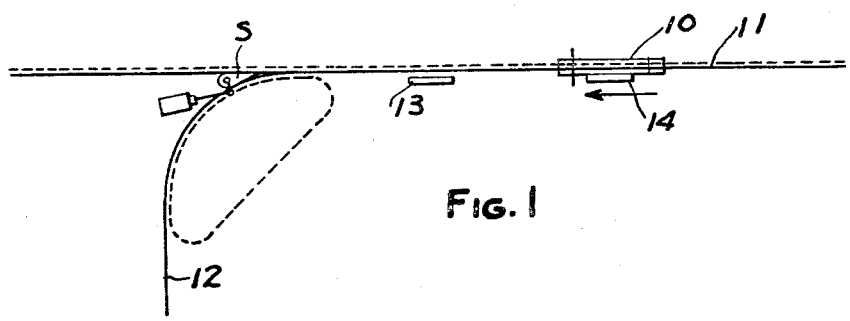
FIG. 1 is a diagrammatic view of a conveyor system embodying the invention.

Referring to FIG. 1, the invention as herein described is used in connection with a power and free conveyor system wherein one or more carriers 10 are moved along a main track 11 and can be diverted to and from one or more branch tracks 12 by switches S. One or more readers 13 are provided along either the main or branch tracks and may be energized by a signal assembly 14 on the carrier and provide a signal for diverting or stopping the carrier or performing some other function.

Referring specifically to FIGS. 3 and 4, a typical power and free conveyor system such as shown diagrammatically in FIG. 1 comprises an upper track 15 which supports trolleys 16 which in turn support a chain 17 having pusher dogs 18 thereon. A lower track 19 supports the trolleys 20, 21 of a carrier. Trolley 20 includes a pusher dog 22 and a half back dog 23 in accordance with conventional practice such that the pusher dog 18 of the chain 17 can engage the pusher dog 22 of the trolley 20 to move the carrier 20 along the track. The aforementioned arrangement is conventional.

In accordance with the invention, the reader assemblies 13 are provided at spaced points along the conveyor. Each reader assembly comprises a bracket 25 which is fixed on the side of one of the rails of track 19. A pair of arms 26 swingably support a reader bar 27 for movement downwardly and rearwardly into the path of the carrier. Reader bar 27 comprises a plastic lower body 28 that supports longitudinally spaced reed switches 29, 30. The switch 29 is spaced longitudinally from the next adjacent switch 30 a distance greater than the distance between the succeeding switches 30, the latter spacing being equal.

The switch 29 functions as a master switch, as presently described, and the switches 30 are selectively connected in series to form the signal selection or array for the particular reader station. An upper section 31 is provided on the bar 27 through which the electrical connections are made to the switches 29, 30. The switches are preferably mounted vertically.

Referring to FIGS. 5 and 6, the signal assembly 14 on each carrier comprises a pair of aluminum members 35 which are mounted on the carrier by bolts 36, nuts 37 and spacers 38 and have longitudinally spaced complementary grooves or openings therein between which magnets 40 are clamped at longitudinally spaced points relative to one another. The magnets 40, 41 are arranged in longitudinal array corresponding to the desired signal for the particular carrier. Thus, as shown in FIG. 5, a magnet 40 is provided in a position corresponding to the master switch 29 and magnets 41 are provided at longitudinally spaced points corresponding to the first and fourth switches 30. The magnets are preferably mounted vertically with the poles of the adjacent magnets being arranged alternately as shown.

As a carrier moves longitudinally of the conveyor, a bumper bar 42 is adapted to engage the beveled surface 43 on the section 28 and swing the reader bar 27 upwardly and forwardly to a position wherein further movement of the members 35 beneath the reader bar 27 causes the lower surface of section 28 of the reader bar 27 to engage the upper surfaces of the sections 35.

As the carrier continues to move, if the array of the magnets 40, 41 corresponds to the arrangement of the switches 29, 30 which are electrically interconnected, then an electrical signal is produced for actuating a mechanism to divert the carrier, stop the carrier or perform some other function. As the carrier continues to move forwardly, the reader bar 27 swings downwardly.

Figure 2:
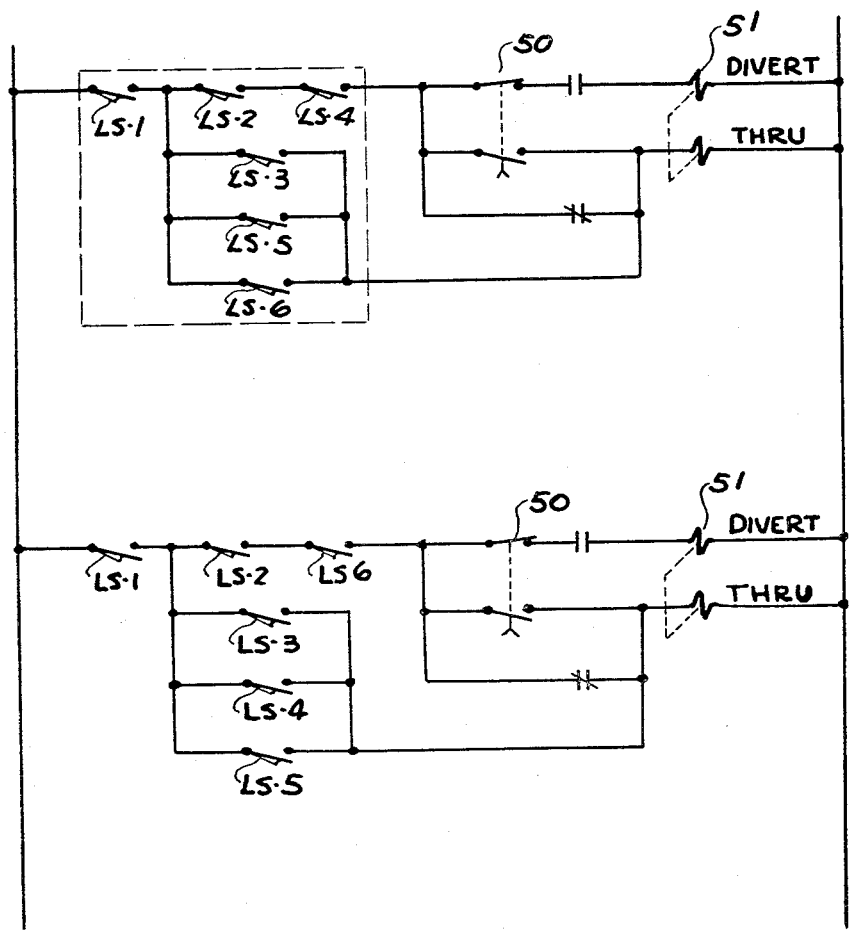
FIG. 2 is a schematic wiring diagram of a portion of a typical system.

Referring to FIG. 2, the manner in which the switches are electrically connected to produce a signal is shown with reference to two different reader arrangements. In the upper half of FIG. 2, the switches LS1, LS2, LS4 corresponding to the master switch 29 and the second and fourth switches 30 are connected in series. Thus, if the magnets corresponding to the longitudinal spacing of these switches are in position, all these switches will be closed simultaneously causing the contacts 50 of the relay to be opened and closed respectively to energize the solenoid 51 and produce the desired signal, for example, for diverting the carrier. The relay 50 includes a time delay so that even though the carrier passes the signal reader position, the signal will be maintained for a predetermined interval of time.

In the arrangement shown in the lower half of FIG. 2, the switches corresponding to the master switch 29 and the second and fifth switches 30 are connected in series to produce the signal if the magnets on the signal carrier are in proper corresponding array.

I claim:
1. The combination comprising:
a plurality of carriers,
a conveyor system including at least one track along which said carriers are adapted to move,
a reader assembly,
means for supporting said reader assembly along the path of said carriers for movement toward and rearwardly and away and forwardly with respect to the direction of movement of said carriers,
said reader assembly comprising a plurality of switches electrically connected in series and disposed longitudinally of the direction of movement of the carriers along said path,
one of said switches comprising a master switch in series with all of the remaining switches,
the others of said switches comprising secondary switches selectively connected in series with one another in accordance with the signal desired,
a signal assembly on at least some of said carriers,
said signal assembly comprising a plurality of longitudinally spaced magnets which are selectively arranged to correspond to selected switches in said reader assembly whereby as the carrier moves past said reader assembly, said reader assembly is engaged by said signal assembly and a signal is created if the switch array corresponds to the magnet array.

2. The combination set forth in claim 1 wherein said means for supporting said reader assembly along said path comprises a parallelogram linkage.

3. The combination set forth in claim 1 wherein the spacing between said master switch and one of said secondary switches is different from the spacing between the remainder of said switches.

4. The combination set forth in claim 1 wherein said magnets are oriented in a vertical position with the poles of the magnets being alternately arranged longitudinally of the signal assembly.

5. The combination set forth in claim 1 wherein said signal assembly comprises a pair of members between which said magnets are clamped.

6. The combination set forth in claim 1 wherein said switches comprise reed switches mounted in transverse relation to the path of the carriers.

7. A signal system for use with a conveyor system wherein a plurality of carriers are moved along a track,
a reader assembly,
means adapted to support said reader assembly along the path of said carriers for movement toward and rearwardly and away and forwardly with respect to the direction of movement of said carriers,
said reader assembly comprising a plurality of switches electrically connected in series and disposed longitudinally of the direction of movement of the carriers along said path,
one of said switches comprising a master switch in series with all of the remaining switches,
the others of said switches comprising secondary switches selectively connected in series with one another in accordance with the signal desired,
a signal assembly adapted to be mounted on a carrier,
said signal assembly comprising a plurality of longitudinally spaced magnets which are selectively arranged to correspond to selected switches in said reader assembly whereby as the carrier moves past said reader assembly, said reader assembly is brought into engagement with said signal assembly and a signal is created if the switch array corresponds to the magnet array.

8. The combination set forth in claim 7 wherein said means for supporting said reader assembly along a portion of said path comprises a parallelogram linkage.

9. The combination set forth in claim 7 wherein the spacing between said master switch and one of said secondary switches is different from the spacing between the remainder of said switches.

10. The combination set forth in claim 7 wherein said magnets are oriented in a vertical position with the poles of the magnets being alternately arranged longitudinally of the signal assembly.

11. The combination set forth in claim 7 wherein said signal assembly comprises a pair of members between which said magnets are clamped.

12. The combination set forth in claim 7 wherein said switches comprise reed switches mounted in transverse relation to the path of the carriers.

References Cited

UNITED STATES PATENTS

| | | | |
|---|---|---|---|
| 3,146,874 | 9/1964 | McGow | 104—88 |
| 3,158,710 | 12/1964 | Paglee | 104—88 |
| 3,200,933 | 8/1965 | Schenk | 104—88 |

ARTHUR L. LA POINT, *Primary Examiner.*

D. F. WORTH, *Assistant Examiner.*